United States Patent
Chan et al.

(10) Patent No.: US 7,937,259 B1
(45) Date of Patent: May 3, 2011

(54) VARIABLE CLOCKING IN HARDWARE CO-SIMULATION

(75) Inventors: Chi Bun Chan, San Jose, CA (US); Bradley L. Taylor, San Jose, CA (US); Nabeel Shirazi, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 666 days.

(21) Appl. No.: 12/002,838

(22) Filed: Dec. 18, 2007

(51) Int. Cl.
*G06F 9/455* (2006.01)

(52) U.S. Cl. .......................................... 703/28

(58) Field of Classification Search ............. 703/13, 703/28; 716/6, 18
See application file for complete search history.

(56) References Cited

U.S. PATENT DOCUMENTS

| 7,085,976 | B1 | | 8/2006 | Shirazi et al. | |
|---|---|---|---|---|---|
| 7,143,369 | B1 | * | 11/2006 | Milne | 716/4 |
| 2003/0171908 | A1 | * | 9/2003 | Schilp et al. | 703/16 |
| 2006/0117274 | A1 | * | 6/2006 | Tseng et al. | 716/1 |

OTHER PUBLICATIONS

"Xplorer: Xplorer maximizes design performance" downloaded from http://www.xilinx.com/products/design_tools/logic_design/implementation/xplorer.htm, Dec. 12, 2007, 1 page, Xilinx, Inc. 2100 Logic Drive, San Jose, California.
Hitesh Patel, "Accelerate Design Performance Using Xplorer", Xcell Journal, Fourth Quarter 2005, Dec. 1, 2005, pp. 25-27.

\* cited by examiner

*Primary Examiner* — Jason Proctor
*Assistant Examiner* — Andre Pierre Louis
(74) *Attorney, Agent, or Firm* — LeRoy D. Maunu; Thomas George (57) ABSTRACT

Various embodiments of a co-simulation system are disclosed. In one embodiment, a data processing arrangement executes a simulator that simulates a first block of an electronic circuit design. A first clock source generates a first clock signal, and a second clock source generates a second clock signal. The first and second clock signals are independent one from another, and an operating frequency of the second clock signal is dynamically adjustable from a clock control interface. A programmable logic device (PLD) is configured with logic that includes a co-simulation interface clocked by the first clock signal, a second block of the electronic circuit design that is clocked by the second clock signal, and a synchronizer that controls data transmission between the co-simulation interface and the second block.

19 Claims, 5 Drawing Sheets

VARIABLE CLOCKING IN HARDWARE CO-SIMULATION

FIELD OF THE INVENTION

The present invention generally relates to simulating electronic circuit designs. More particularly, the invention relates to performing hardware co-simulation of electronic circuit designs.

BACKGROUND

A high level modeling system (HLMS) is a software tool in which electronic designs can be described, simulated, and translated by machine into a design realization. An HLMS provides a higher level of abstraction for describing an electronic circuit than a hardware description language (HDL) simulation environment such as the ModelSim environment from the Model Technology company. An HLMS generally provides a mathematical representation of signals, as compared to standard logic vectors in a hardware description language (HDL). It is desirable for the high-level abstractions to be precisely correlated with the ultimate implementation representation, both in simulation semantics and in implementation. The System Generator tool for DSP (Sysgen) and ACCELDSP™ from XILINX, Inc., and SIMULINK® and MATLAB® environments from The MathWorks, Inc., are examples of such HLMSs.

An HLMS for electronic circuit design generally offers abstractions that are not available in traditional HDLs. For example, an HLMS is likely to offer abstractions that relate to signal propagation and signal state, while an HDL may support a detailed representation that more closely models a realized electronic circuit. An electronic design modeled in an HLMS may be viewed as a collection of components that communicate through signals. Signals are discrete, time-varying sequences of values. An HLMS generally provides abstractions to support implementing synchronous designs without requiring the specification of explicit references to clocks or clock signals. Instead of providing a detailed, event driven simulation, an HLMS may also provide abstractions wherein clock-synchronous state changes are scheduled to occur at regular intervals, and in which there is no notion of the timing characteristics related to the intended implementation as an electronic circuit. In further support of creating high-level designs, an HLMS may also represent states in terms of numerical (or other abstract) values instead of representing states in a detailed format analogous to standard logic vectors.

An HLMS such as Sysgen also has the capability to generate objects for co-simulating using a hardware platform. Co-simulation generally refers to dividing a design into portions and simulating the portions on two or more platforms. There are different types of platforms on which designs may be co-simulated.

Example co-simulation platforms include both software-based and hardware-based systems. The MODELSIM® simulation environment from Mentor Graphics Corp. and the NC-Sim simulator from Cadence Design Systems, Inc., are example software-based systems, and the Wildcard and BENONE® hardware-based platforms from Annapolis Microsystems and Nallatech, Inc., respectively, are example hardware-based systems. The WildCard and BENONE boards are often used for algorithm exploration and design prototyping, and include programmable logic devices (PLDs). In software-based co-simulations, the user may perform a behavioral simulation or perform simulation using a synthesized and mapped version of the design.

In a hardware-based system, a portion of the design is emulated on a hardware platform that includes a programmable logic device (PLD), such as a field programmable gate array (FPGA). Co-simulating on a hardware platform may be used to reduce the time required for a simulation run.

In a typical hardware-based co-simulation system, a hardware co-simulation interface (HWCIF) is combined with the portion of the design to be emulated ("hardware block") on the PLD, for example. The HWCIF supports interactions between the parts of the design simulated in a software-based system and the hardware block. To facilitate lock-step simulations, the HWCIF also controls the clocking of the hardware block. The clock signal to the hardware block is temporarily gated off during the transmission of stimuli and results. When the transmission completes, a single or multiple clock cycle pulses are applied to the hardware block synchronous with the software simulation cycle.

In current hardware co-simulation systems the clock signal to the hardware block is controlled by the HWCIF, and the HWCIF may control stepping of the clock signal or allow the clock to run freely. In the step mode, the HWCIF issues an alternating bit pattern to produce a single cycle or a number of cycles for the clock signal to the hardware block. In the free running mode, the clock signal provided to the hardware block is generally the same as the clock signal used by the HWCIF.

The present invention addresses one or more issues in such co-simulation arrangements that may have been unrecognized.

SUMMARY

The invention provides various approaches for co-simulating an electronic circuit design. In one embodiment, a co-simulation system comprises a data processing arrangement that executes a simulator for simulating a first block of an electronic circuit design. A first clock source generates a first clock signal, and a second clock source generates a second clock signal. The first and second clock signals are independent one from another, and an operating frequency of the second clock signal is dynamically adjustable from a clock control interface. A programmable logic device (PLD) is configured with logic that includes a co-simulation interface clocked by the first clock signal, a second block of the electronic circuit design that is clocked by the second clock signal, and a synchronizer that controls data transmission between the co-simulation interface and the second block.

In another embodiment, a method is provided for co-simulating an electronic circuit design. The method comprises simulating a first block of the design in a simulator executing on a data processing arrangement. A second block of the design is simulated in a programmable logic device (PLD) that is coupled to the data processing arrangement. The simulating of the second block includes transmitting data between the first block and the second block via a co-simulation interface implemented on the PLD. A first clock signal is provided to the co-simulation interface from a first clock source, and a second clock signal is provided to the second block from a second clock source. The first and second clock signals are independent one from another. Transmission of data between the co-simulation interface and the second block is synchronized. The result data from the simulating of the first and second blocks is stored, the frequency of the second clock signal is changed, and the simulation is repeated.

Another embodiment, of a co-simulation system, comprises means for simulating a first block of an electronic circuit design, means for generating a first clock signal, and means for generating a second clock signal. The first and second clock signals are independent one from another, and an operating frequency of the second clock signal is dynamically adjustable. A programmable logic device (PLD) is coupled to the means for simulating and is configured with logic that includes a co-simulation interface coupled to the means for generating the first clock signal, and a second block of the design coupled to the co-simulation interface and further coupled to the means for generating the second clock signal. The PLD also is configured with a means for controlling data transmission between the co-simulation interface and the second block.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

In current co-simulation systems the clock signal applied to the hardware block may be controlled via the hardware co-simulation interface (HWCIF), either by stepping the clock signal (applying a selected number of cycles of the clock signal) or allowing the clock to run freely (no counting of clock cycles). However, because the clock signal to the hardware block is strongly coupled to the HWCIF, the range of clock frequencies that may be tested is constrained by the HWCIF. The constraints thereby limit the possible test scenarios for the design. For example, in one scenario the hardware block may need to be simulated at a certain frequency in order to test the required functionality. However, that certain frequency may not be achievable in the simulation when constrained by the HWCIF. A specific example is to perform runtime bit error rate testing with a free-running clock to the hardware block. In another scenario, the hardware block may need to be clocked at a lower frequency in order to satisfy the timing constraints for the block's critical paths. However, that lower frequency may be below that which the HWCIF is capable of providing. For benchmark or verification purposes, it is sometimes required or desired to sweep through a range of frequencies of the clock signal to the hardware block. Rather than changing or re-implementing the design, it would be preferable to dynamically change the frequency of the clock signal to the hardware block while the hardware block is running. However, the tight coupling of the HWCIF to the clock signal to the hardware block prevents this type of testing.

The various embodiments of the invention address these and other problems by providing a co-simulation system that has independent clock sources for the hardware co-simulation interface and the hardware block. A software-based simulator executes on a data processing arrangement for simulating a part of the design. The data processing arrangement also hosts an interface that provides external, dynamic control over the frequency of the clock signal provided to the hardware block. Based on design requirements and/or simulation results, the clock to the hardware block may be dynamically adjusted.

A programmable logic device (PLD), which is part of the co-simulation system, is configured with logic that implements the functions of the hardware block and logic that provides a co-simulation interface. The co-simulation interface on the PLD is clocked by a first clock source, and the hardware block is clocked by a second clock source. The first and second clock sources are independent (i.e., the clock outputs of the two clock sources are independent one from another) and each may be internal or external to the PLD. The PLD is further configured with a synchronizer that is coupled to the first and second clock sources. The synchronizer controls data transmission between the co-simulation interface and the hardware block. In some embodiments, the synchronizer provides single and multi-step control over the second clock source.

Figure 1:
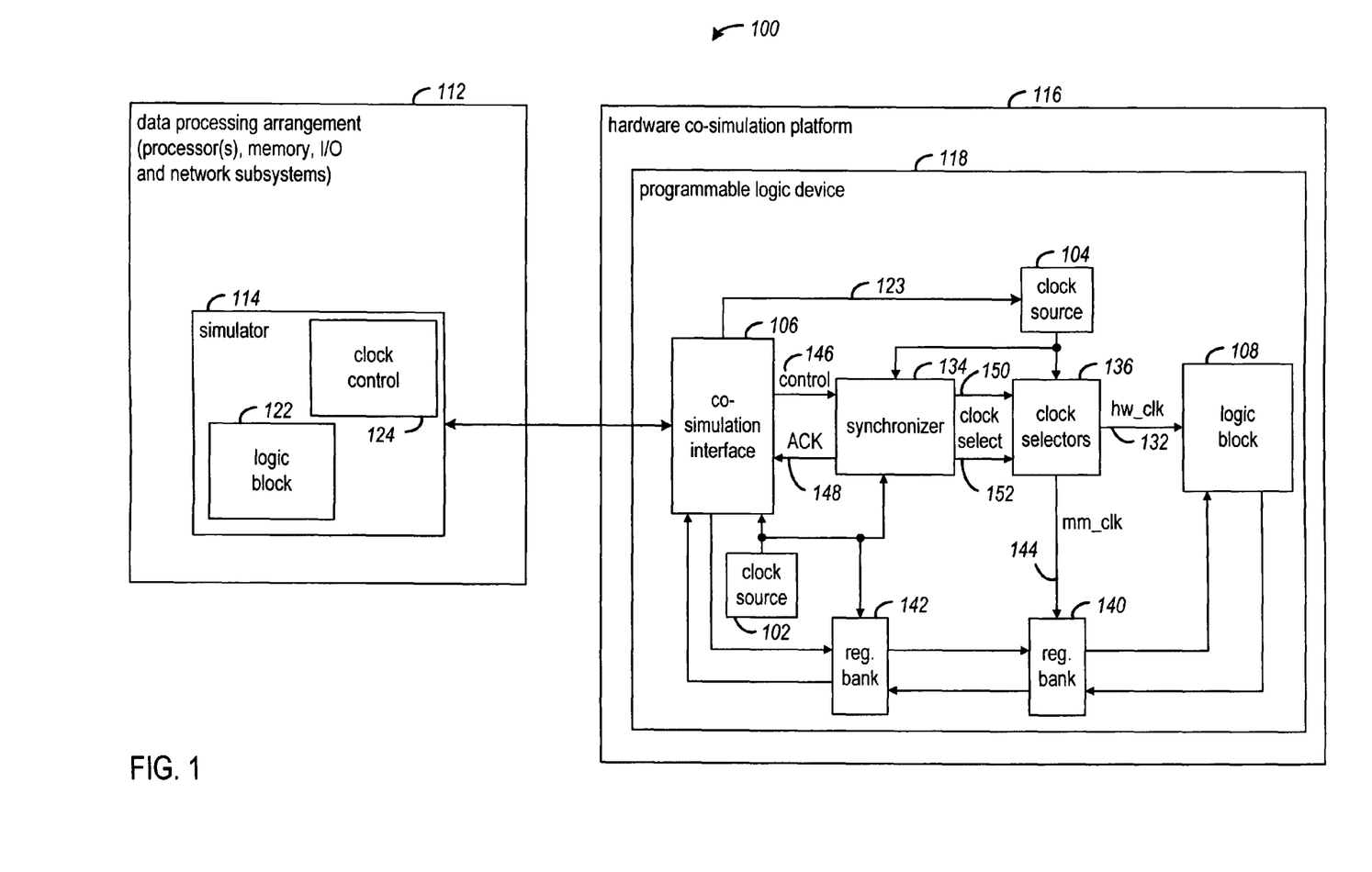
FIG. 1 is a functional block diagram of a co-simulation arrangement having independent clock sources for a co-simulation interface and a simulated hardware block.

FIG. 1 is a functional block diagram of a co-simulation arrangement 100 having independent clock sources 102 and 104 for the co-simulation interface 106 and for the hardware block 108, respectively. The simulation arrangement further includes a data processing arrangement 112 that hosts a simulator 114, and a hardware co-simulation platform 116 having a programmable logic device PLD 118.

The data processing arrangement 112 hosts simulator 114, in which a portion of the design (i.e., logic block 122) is simulated. In one embodiment the data processing system is a computer workstation and in an alternative embodiment the data processing arrangement may be a collection of workstations coupled to a network. In some embodiments, the data processing arrangement may be a large-scale, multi-processor, shared-memory computer system.

The simulator 114 is a software program that executes on the data processing arrangement and that provides functions for simulating logic block 122 in combination with hardware-based simulation of logic block 108. Example simulators include MODELSIM and NC-Sim, as identified above. Those skilled in the art will recognize that various other simulators are operable in accordance with the embodiments of the invention.

The clock control component 124 is also hosted on data processing arrangement 112. The clock control provides an interface for changing the operating frequency of clock source 104 while the logic block 108 is simulated in hardware. The clock control may be an integrated part of the simulator or may be a tool operated separately from the simulator. The clock control may be interactively operated by a user via a user interface or may be programmatically operated via a simulation control program (not shown) that analyzes and automatically responds to simulation result data by adjusting the clock frequency. Generally, the simulator governs the clock control based on the simulation requirements.

To control clock source 104, the simulator 114 issues commands to the hardware co-simulation interface 106 over the same communication channel that is used for sending co-simulation commands. The clock control capability is implemented as clock control commands. The hardware co-simulation interface 106 translates these commands into control signals to the clock resources, such as clock multiplexers and digital clock managers on the PLD. Line 123 illustrates the control to these clock resources.

The hardware co-simulation platform 116 includes a PLD 118 for simulating the logic block 108. Example hardware-based co-simulation platforms are the Wildcard and BENONE platforms referenced above. The PLD 118, in an example embodiment, is a field programmable gate array (FPGA). Depending on simulation requirements, other types of PLDs, such as CPLDs, may be used in the co-simulation.

The hardware co-simulation interface 106 is implemented in configurable logic on the PLD and provides the interface between the simulator 114 and the simulating of the logic block 108 on the PLD. The implementation of the hardware co-simulation interface depends on application requirements and example options include Joint Test Action Group (JTAG), Ethernet, and Peripheral Component Interconnect (PCI) interfaces.

The interface functions provided by the co-simulation interface include data transfer and clock mode commands. The data transfer functions are for moving simulation data between the simulator 114 and the hardware-simulated logic block 108. The simulation data may be sourced from logic block 122 and destined to logic block 108 and/or the converse. The command interface is for commands from the simulator for controlling the clock mode to the logic block. The clock modes in the example embodiment include n-step and free running. In n-step mode the simulator 114 individually triggers n steps of the clock hw_clk signal 132 to the logic block 108; and in free running mode, the hw_clk signal steps at the rate of the clock source 104.

Synchronizer 134 controls data transfer between the domain of clock source 104 and the domain of clock source 102. In addition, the synchronizer controls clock selectors 136, which provide the hw_clk signal to the logic block 108 and which provide the mm_clk 144 signal to the register bank 140. For data input to the logic block 108, clock source 102 enables input registers in register bank 142, and the mm_clk signal enables (based on clock source 104 and selectors 136 controlled by the synchronizer) input registers in register bank 140. For data output from logic block 108, the mm_clk signal enables output registers in register bank 140, and the clock source 102 enables corresponding output registers in register bank 142.

Data input and output controls, as well as clock mode controls, are input from co-simulation interface 106 to synchronizer 134 via control line 146. The synchronizer acknowledges receipt of data and clock mode commands on ACK line 148. Synchronizer 134 generates clock control signals on lines 150 and 152 for providing the hw_clk signal 132 and mm_clk signal 144 according to the clock mode.

Either or both of the clock sources 102 and 104 may be internal or external to the PLD. In one embodiment, an internal clock source is implemented using the digital clock manager (DCM) to implement a frequency synthesizer in a PLD. FPGAs from Xilinx are examples of PLDs having such resources that support dynamic reconfiguration of the clock resource while the logic block 108 is operating on the FPGA. Those skilled in the art will recognize other suitable types of PLDs from other sources for implementing a controllable internal clock source. An external clock source may be either a direct clock source external to the PLD, or an internally synthesized clock source based on an external clock source.

In another embodiment, one or both of the clock sources 104 and 108 are implemented external to the PLD. External, synthesized clock generators can be used to supply the required clock sources with specific frequencies. Several clock generators equipped with an IEEE-488 communication bus can be programmed at runtime to generate different frequencies. The simulator 114 can use this programmable interface to adjust the clock sources dynamically.

Whether internal or external, the separate and independent clock sources 102 and 104 permit the co-simulation interface 106 and logic block 108 to be operated at different frequencies. Clock source 104 may be configured to run faster than, slower than, or at the same rate as clock source 102.

Figure 2:
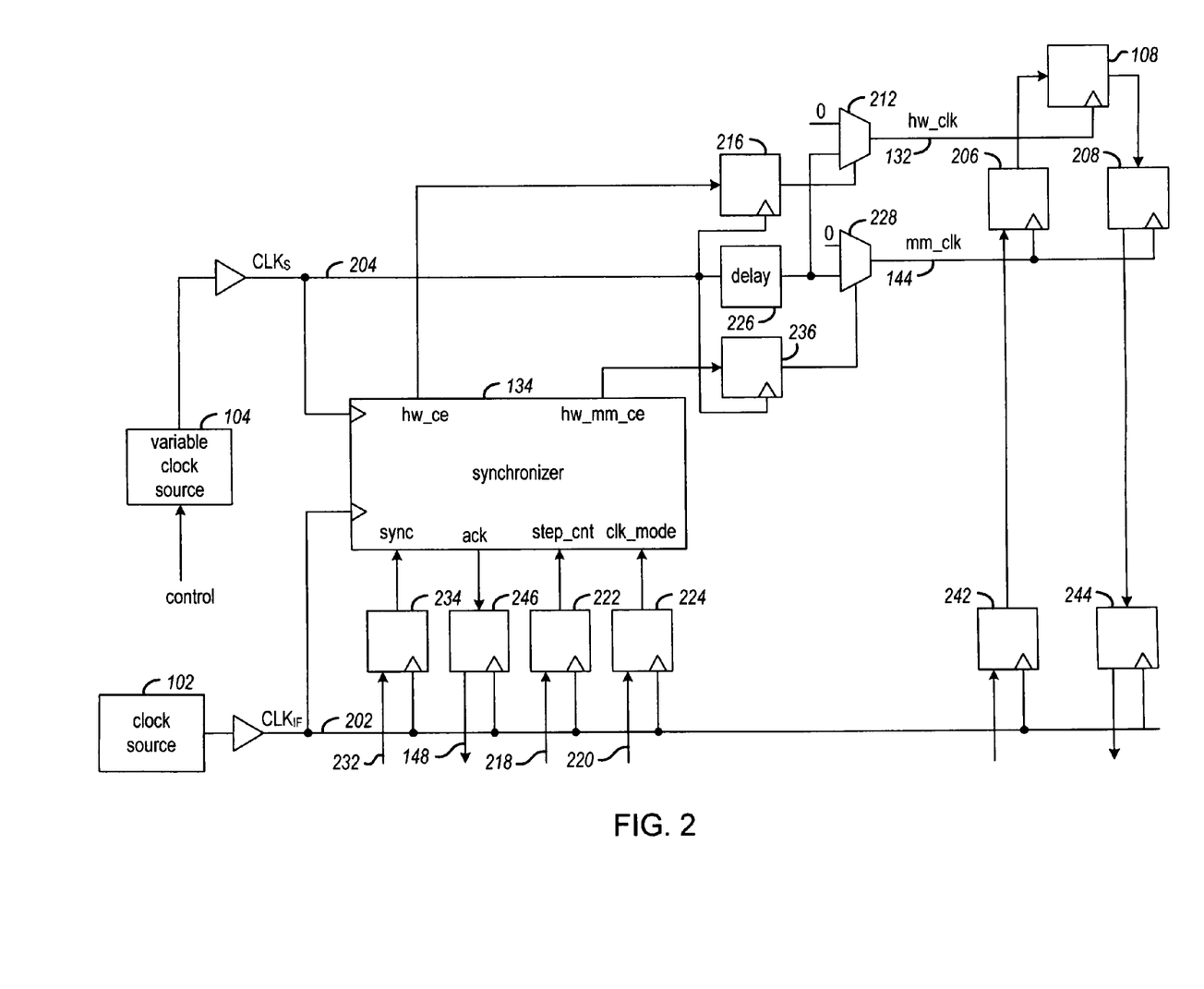
FIG. 2 illustrates in further detail an embodiment of register banks and clock selection circuitry.

FIG. 2 illustrates in further detail an embodiment of the register banks 140 and 142 and clock selection circuitry 136. The diagram further illustrates the decoupling of the clock sources of the co-simulation interface and the hardware logic block. Clock source 102 provides the $CLK_{IF}$ signal 202 and clock source 104 provides the $CLK_S$ signal 204. The $CLK_S$ signal, hw_clk signal 132 to the logic block 108, and mm_clk signal 144 to the registers 206 and 208 all have the same frequency. The hw_clk 132 is gated to provide a clock signal according to the selected clock mode. The mm_clk 144 is gated to provide synchronization between the hardware block 108 within the clock domain of clock source 104.

In the example embodiment, the gating of the hw_clk 132 is implemented with a multiplexer 212. Multiplexer 212 selects between the clock signal from the second clock source and a steady-state signal based on the clock mode. The synchronizer 134 generates the hw_ce signal, the state of which is stored in register 216, to select between the delayed $CLK_S$ signal and the steady state signal. The state of the hw_ce signal depends on the clock mode. For example, in step mode the hw_ce signal is asserted for n cycles, and in free-running mode, the hw_ce signal remains asserted until the clock mode is changed. The synchronizer 134 asserts the hw_ce signal based on the step_cnt and clk_mode signals 218 and 220 that are input via the registers 222 and 224 of the co-simulation interface, respectively.

To meet the setup and hold time requirements of the clock multiplexers, $CLK_S$ is delayed using delay circuit 226 before driving the clock multiplexers 212 and 228. A symmetric arrangement is used to gate hw_clk 132 and mm_clk 144, which allows skew between the two clock signals to be easily minimized during place-and-route of the design and supporting interface circuitry.

The sync signal 232 that is input to the synchronizer via register 234 signals the availability of input data or expectation of output data to the hardware block 108. In response, the synchronizer asserts the hw_mm_ce signal, the state of which is stored in register 236, to control selection of $CLK_S$ instead of the steady state signal at multiplexer 228. The mm_clk signal from multiplexer 228 enables the storage of data in registers 206 and 208 in the domain of clock source 104. In the domain of clock source 102, the $CLK_{IF}$ clock signal enables the registers 242 and 244 for data transfer. Once the data transfer is complete, the synchronizer asserts the ack signal for return to the co-simulation interface via register 246.

Registers 206, 208, 242, and 244 illustrate a portion of a memory map interface between the co-simulation interface and the logic block. The memory map includes a set of register pairs, two of which are shown in FIG. 2. One pair includes registers 206 and 242 and another pair includes registers 208 and 244. Each pair corresponds to one I/O port of the logic block 108. The co-simulation interface maps memory addresses of registers 242 and 244 to the corresponding I/O ports of the logic block 108. While only two pairs of registers are shown, it will be recognized that there would generally be a respective pair of registers for each I/O port of the logic block 108.

It will be appreciated that other embodiments may use circuitry other than the multiplexers 212 and 228 based on the specific clock resources and capabilities of the PLD. For example, a clock buffer with an enable signal can be used where the enable signal is the select signal in the multiplexer embodiment.

Figure 3:
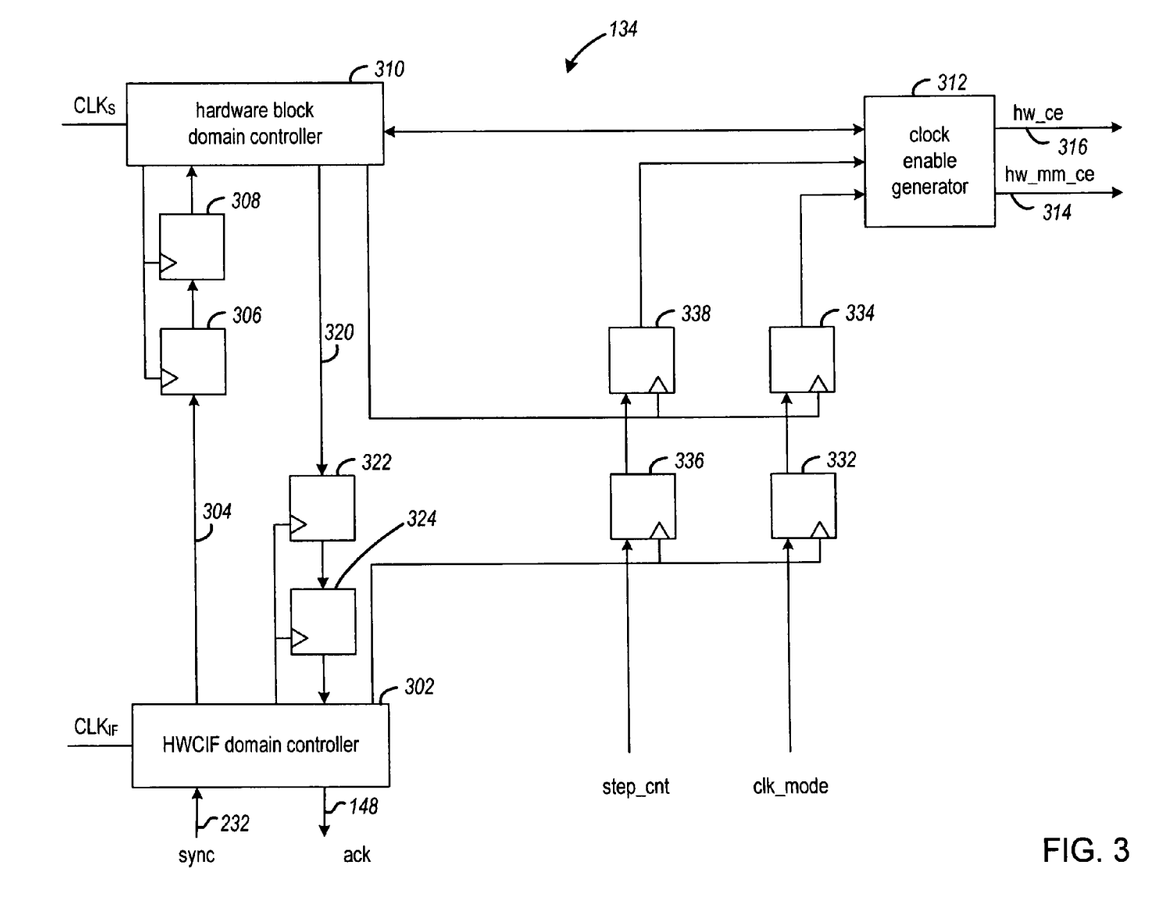
FIG. 3 illustrates in further detail an example embodiment of a synchronizer.

FIG. 3 illustrates in further detail an example embodiment of synchronizer 134. In addition to the selection of the clock signal based on the clock mode, the synchronizer also controls the transfer of data between the two clock domains. In the example embodiment, a flop-based, two-way handshaking synchronization approach is implemented. Those skilled in the art will recognize other approaches and variations that can be used for controlling the transfer of data between clock domains.

In controlling the input of data to the hardware logic block, the input data is first latched in an input register (FIG. 2, 242) in the $CLK_{IF}$ clock domain. In response to an input sync signal 232, the HWCIF domain controller 302 emits a single bit synchronization signal 304 to the $CLK_S$ clock domain. To handle meta-stability, the synchronization signal is captured by the two flip-flops 306 and 308, both of which are clocked by signal $CLK_S$. Upon receiving the synchronization signal, the hardware block domain controller 310 controls the clock enable generator 312 to pulse mm_clk 144 (FIG. 2) by way of pulsing the hw_mm_ce signal 314 which is used as the selector to the multiplexer 228 (FIG. 2). The pulsed mm_clk 144 enables register 206 (FIG. 2) to load the data from register 242. The data from input register 206 is input to the logic block 108 once the hw_clk signal 132 is active (FIG. 2), as selected by the hw_ce signal 316 from the clock enable generator 312. If any output port of the hardware logic block is combinationally driven by some input ports, mm_clk is pulsed for two consecutive cycles before applying the hw_clk signal, to ensure that data is propagated properly across the memory map.

To ensure proper synchronization in both directions, a single bit acknowledge signal 320 is generated by the hardware block domain controller 310 at the end of the synchronization process. The acknowledge signal is transmitted to flip-flop 322 and propagated to flip-flop 324, both of which are enabled by $CLK_{IF}$. The HWCIF domain controller outputs ack signal 148 to complete the synchronization process.

Data output from the logic block is performed in a similar fashion but in the opposite direction.

For controlling the clock mode, the clock mode selection signal and step count value are transferred from the co-simulation interface to the clock enable generator 312 in a manner similar to the transfer of input data to the hardware logic block as described above. That is, pairs of registers are used to transmit the clock control data from the $CLK_{IF}$ clock domain to the $CLK_S$ clock domain. A synchronization signal 304 is asserted at the beginning of the process. Register 332, which is enabled by $CLK_{IF}$, and register 334, which is enabled by $CLK_S$, comprise the register pair for input of the clk_mode to the clock enable generator 312. In the clock step mode, the clock enable generator asserts the hw_ce clock signal 316 for the number of cycles specified by step_cnt, which is transferred via register 336 in the $CLK_{IF}$ clock domain to register 338 in the $CLK_S$ clock domain. An acknowledge signal 320 is asserted after the n-cycle pulse has been applied to the hardware logic block. In the free running clock mode, the hw_ce signal is always asserted.

Figure 4:
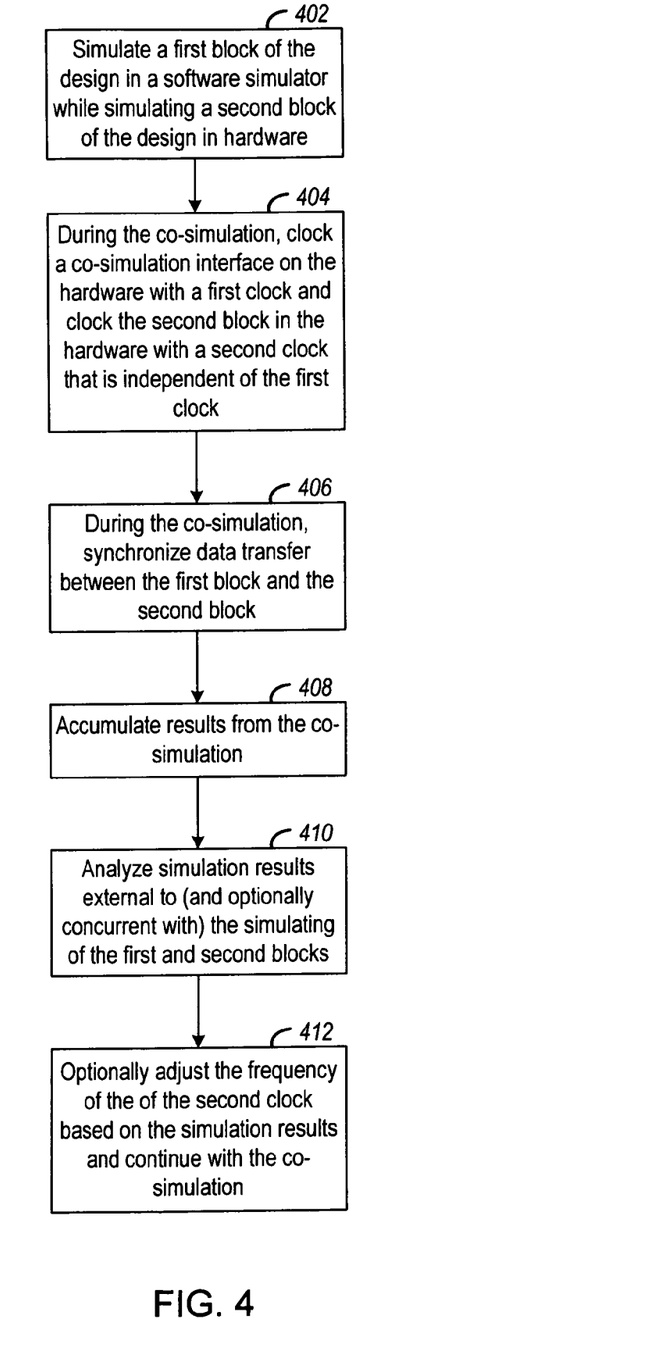
FIG. 4 is a flow chart of an example process for co-simulating an electronic circuit design using independent clock sources and dynamically adjusting the clock source that clocks the logic block being simulated in hardware.

FIG. 4 is a flow chart of an example process for co-simulating an electronic circuit design using independent clock sources and dynamically adjusting the clock source that clocks the logic block being simulated in hardware.

At step 402, a first block of the design is simulated in a software simulator while simulating a second block of the design in hardware. In one embodiment, a PLD is used in simulating the second block.

During the co-simulation, a co-simulation interface on the hardware is clocked with a first clock and the second block in the hardware is clocked with a second clock that is independent of the first clock at step 404. The clock sources may be internal or external to the PLD.

Also during the co-simulation, at step 406 data transfer between the first block and the second block is synchronized. A two-way handshaking protocol can be used to control the transfer of data between the co-simulation interface in the clock domain of the first clock and the hardware block in the clock domain of the second clock.

At step 408, results from the co-simulation are accumulated. The data is stored for subsequent analysis. Whether electronic, magnetic, optical or other storage means is used depends on individual design requirements.

The accumulated simulation results are analyzed external to (and optionally concurrent with) the simulating of the first and second blocks at step 410. The analysis depends on test requirements and may be as simple as comparing the accumulated data to expected results. Other test scenarios may require more sophisticated statistical and/or quantitative comparisons between multiple runs of a test with varying inputs.

The frequency of the second clock is then adjusted at step 412 and the co-simulation continues with the second clock's new operating frequency. The frequency may be adjusted up or down and may be adjusted dynamically while the second block is running. The change in operating frequency depends on the application requirements, which are specified by the designer. In other applications, the frequency may be determined by the PLD implementation tools based on the timing analysis of the implemented design. The designer may further refine the frequency determined by the tools. Changing the design-clock frequency may also be in response to the result data.

Figure 5:
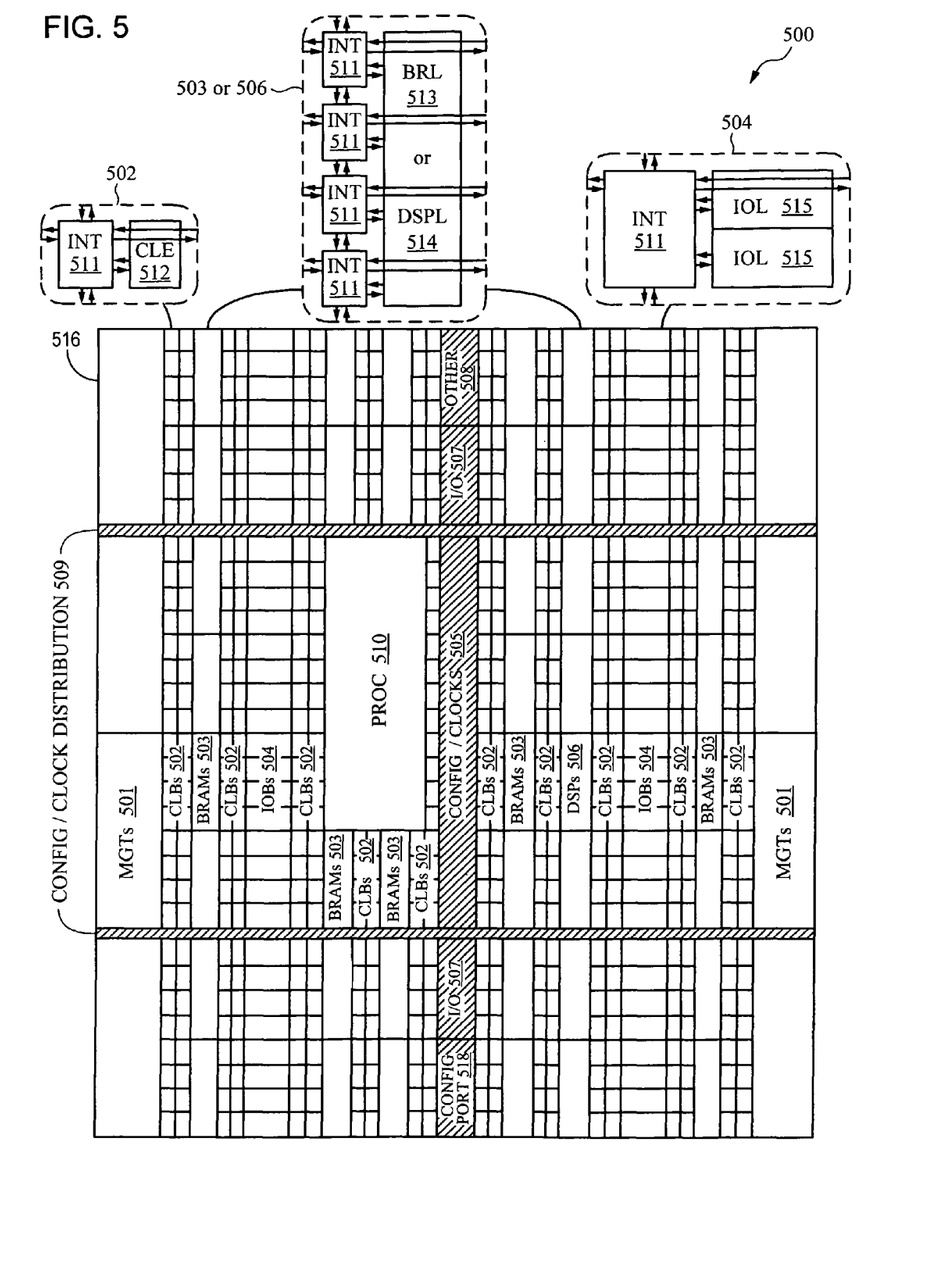
FIG. 5 illustrates an example FPGA architecture on which a system may be implemented using the various approaches described herein.

FIG. 5 illustrates an example FPGA architecture 500 on which a system may be implemented using the various approaches described herein. FPGA 500 includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include a hardwired processor 510.

In some FPGAs, each programmable tile includes a programmable interconnect element (INT 511) having standardized connections to and from a corresponding interconnect element in each adjacent tile. Therefore, the programmable interconnect elements taken together implement the programmable interconnect resources for the illustrated FPGA. The programmable interconnect element (INT 511) also includes the connections to and from the programmable logic primitive within the same tile, as shown by the examples included at the top of FIG. 5.

For example, a CLB 502 can include a configurable logic primitive (CLE 512) that can be programmed to implement user logic plus a single programmable interconnect element (INT 511). A BRAM 503 can include a BRAM logic primitive (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic primitive (DSPL 514) in addition to an appropriate number of programmable interconnect elements. An 10B 504 can include, for example, two instances of an input/output logic primitive (IOL 515) in addition to one instance of the programmable interconnect element (INT 511). As will be clear to those of skill in the art, the actual I/O pads connected, for example, to the I/O logic primitive 515 are manufactured using metal layered above the various illustrated logic blocks, and typically are not confined to the area of the input/output logic primitive 515.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Configuration port 518 may be used to access configuration memory in the FPGA 516 to configure the programmable logic and interconnect resources. In one embodiment, an internal scrubber (not shown) may continuously read and correct configuration memory via an internal configuration access port.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures of the different embodiments of the present invention.

The present invention is thought to be applicable to a variety of systems for co-simulating electronic circuit designs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A co-simulation system, comprising:
a data processing arrangement configured to execute a simulator that simulates a first block of an electronic circuit design, and further configured to execute a clock control interface;
a first clock source that generates a first clock signal;
a second clock source that generates a second clock signal and is coupled to the clock control interface, wherein the first and second clock signals are independent one from another, and an operating frequency of the second clock signal is dynamically adjustable from the clock control interface;
a programmable device coupled to the data processing arrangement;
wherein the programmable device is configured to include:
a co-simulation interface coupled to the simulator and further coupled to the first clock source;
a second block of the electronic circuit design coupled to the co-simulation interface and further coupled to and clocked by the second clock source; and
a synchronizer coupled to the first and second clock sources, to the co-simulation interface, and to the second block for controlling data transmission between the co-simulation interface and the second block; wherein the synchronizer comprises: a first domain controller coupled to the co-simulation interface and to the first clock source; a second domain controller coupled to the second clock source; a first serial chain of at least two registers enabled by the first clock signal; a second serial chain of at least two registers enabled by the second clock signal; wherein the first and second domain controllers use the first and second serial chains of registers for transmission of control signals in a handshake protocol used in controlling clock signal selection by the synchronizer and in data transmission between the second block and the co-simulation interface.

2. The system of claim 1, wherein the second clock source is external to the programmable device.

3. The system of claim 1, wherein the synchronizer controls application of cycles of the second clock signal to the second block responsive to control from the simulator.

4. The system of claim 3, wherein the synchronizer applies a selected number of cycles of the second clock signal to the second block responsive to control from the simulator.

5. The system of claim 3, wherein the synchronizer, responsive to control from the simulator, applies cycles of the second clock signal to the second block without limitation to a number of cycles.

6. The system of claim 1, further comprising a multiplexer having a first input coupled to the second clock source, a second input coupled to receive a steady-state signal, and a third control input coupled to the synchronizer, wherein the synchronizer selects between the second clock signal and the steady-state signal in response to control from the simulator.

7. The system of claim 1, wherein the second clock source is configurable to generate the second clock signal to the second block at a greater frequency than a frequency of the first clock signal provided to the co-simulation interface.

8. The system of claim 7, wherein the second clock source is configurable to generate the second clock signal to the second block at a lesser frequency than the frequency of the first clock signal provided to the co-simulation interface.

9. The system of claim 8, wherein the second clock source is configurable to generate the second clock signal to the second block at a frequency equal to the frequency of the first clock signal provided to the co-simulation interface.

10. The system of claim 1, further comprising:
a first multiplexer having a first input coupled to the second clock source, a second input coupled to receive a steady-state signal, and a third control input coupled to the synchronizer, wherein the synchronizer selects between the second clock signal and the steady-state signal in response to control from the simulator;
a second multiplexer having a first input coupled to the second clock source, a second input coupled to receive a steady-state signal, and a third control input coupled to the synchronizer, wherein the synchronizer selects between the second clock signal and a steady state signal to clock each second register in the plurality of pairs.

11. A method for co-simulating an electronic circuit design, comprising:
simulating a first block of the design in a simulator executing on a data processing arrangement;
simulating a second block of the design in a programmable device that is coupled to the data processing arrangement;
wherein the simulating the second block includes:
transmitting data between the first block and the second block via a co-simulation interface implemented on the programmable device;
providing a first clock signal to the co-simulation interface from a first clock source;
providing a second clock signal to the second block from a second clock source;
wherein the first and second clock signals are independent one from another; and
synchronizing data transmitted between the co-simulation interface and the second block; wherein the synchronizing of data transmitted comprises: coupling a first domain controller to the co-simulation interface and to the first clock source, coupling a second domain controller to the second clock source; wherein a first serial chain of at least two registers is enabled by the first clock signal, and a second serial chain of at least two registers is enabled by the second clock signal; and wherein the first and second domain controllers use the first and second serial chains of registers for transmission of control signals in a handshake protocol used in controlling clock signal selection by the synchronizer and in data transmission between the second block and the co-simulation interface;
wherein the synchronizing of data transmitted includes:
providing input data to the second block via at least one input register pair of a plurality of register pairs;
providing output data from the second block via at least one output register pair of the plurality of register pairs;
storing result data from the simulating of the first and second blocks; and
changing a frequency of the second clock signal and repeating the simulating of the first and second blocks.

12. The method of claim 11, wherein the second clock source is external to the programmable device.

13. The method of claim 11, further comprising controlling application of cycles of the second clock signal to the second block in response to control from the simulator.

14. The method of claim 13, further comprising applying a selected number of cycles of the second clock signal to the second block in response to control from the simulator.

15. The method of claim 13, further comprising applying cycles of the second clock signal to the second block without limitation to a number of cycles in response to control from the simulator.

16. The method of claim 11, further comprising selecting between the second clock signal and a steady-state signal for providing to the second block in response to control from the simulator.

17. The method of claim 11, further comprising dynamically configuring the second clock source generate the second clock signal to the second block at a greater frequency than a frequency of the first clock signal provided to the co-simulation interface.

18. The method of claim 17, further comprising dynamically configuring the second clock source to generate the second clock signal to the second block at a lesser frequency than the frequency of the first clock signal provided to the co-simulation interface.

19. A co-simulation system, comprising:
means for simulating a first block of an electronic circuit design;
means for generating a first clock signal;
means for generating a second clock signal, wherein the first and second clock signals are independent one from another, and an operating frequency of the second clock signal is dynamically adjustable; and
a programmable device coupled to the means for simulating and configured to include:
a co-simulation interface coupled to the simulator and coupled to the means for generating the first clock signal;
a second block of the electronic circuit design coupled to the co-simulation interface and further coupled to the means for generating the second clock signal; and
means for controlling data transmission between the co-simulation interface and the second block; wherein the means for controlling data transmission comprises: a first domain controller coupled to the co-simulation interface and to the first clock source, a second domain controller coupled to the second clock source, a first serial chain of at least two registers enabled by the first clock signal, a second serial chain of at least two registers enabled by the second clock signal; wherein the first and second domain controllers use the first and second serial chains of registers for transmission of control signals in a handshake protocol used in controlling clock signal selection by the synchronizer and in data transmission between the second block and the co-simulation interface.

* * * * *